United States Patent
Yeh et al.

(10) Patent No.: US 12,181,741 B2
(45) Date of Patent: Dec. 31, 2024

(54) SEGMENTED MULTILAYER FILM WITH ELECTRICALLY CONTROLLABLE OPTICAL PROPERTIES

(71) Applicant: SAINT-GOBAIN GLASS FRANCE, Courbevoie (FR)

(72) Inventors: Li-Ya Yeh, Aachen (DE); Alexandre Fessemaz, Aachen (DE); Nadine Hecker, Juelich (DE); Florence Jacques, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/553,527

(22) PCT Filed: May 9, 2022

(86) PCT No.: PCT/EP2022/062428
§ 371 (c)(1),
(2) Date: Sep. 29, 2023

(87) PCT Pub. No.: WO2022/268395
PCT Pub. Date: Dec. 29, 2022

(65) Prior Publication Data
US 2024/0184155 A1    Jun. 6, 2024

(30) Foreign Application Priority Data
Jun. 21, 2021   (EP) .................................. 21180573

(51) Int. Cl.
*G02F 1/1333* (2006.01)
*G02F 1/13* (2006.01)
(Continued)

(52) U.S. Cl.
CPC ...... *G02F 1/133391* (2021.01); *G02F 1/1306* (2013.01); *G02F 1/1334* (2013.01);
(Continued)

(58) Field of Classification Search
CPC . G02F 1/133391; G02F 1/1306; G02F 1/1334
See application file for complete search history.

(56) References Cited

U.S. PATENT DOCUMENTS

| | | | |
|---|---|---|---|
| 5,910,854 | A | 6/1999 | Varaprasad et al. |
| 6,056,861 | A | 5/2000 | Fuhr et al. |
| | | (Continued) | |

FOREIGN PATENT DOCUMENTS

| | | |
|---|---|---|
| CN | 111856830 A | 10/2020 |
| DE | 10043141 A1 | 3/2002 |
| | (Continued) | |

OTHER PUBLICATIONS

Google patents translation of JP2020003644A (Year: 2018).*
(Continued)

*Primary Examiner* — Lucy P Chien
(74) *Attorney, Agent, or Firm* — Steinfl + Bruno LLP

(57) ABSTRACT

A multilayer film having electrically controllable optical properties. The multilayer film has a first carrier film, a first planar electrode, an active layer having one or more layers in sequence, a second planar electrode, and a second carrier film, arranged one above the other in a planar manner. The first planar electrode and the active layer and optionally the second planar electrode are divided by at least one insulation line into at least two segments that are electrically insulated from one another. The insulation line is introduced with a laser through one of the carrier films and into the first planar electrode and the active layer and optionally the second planar electrode.

20 Claims, 5 Drawing Sheets

(51) Int. Cl.
  *G02F 1/1334* (2006.01)
  *G02F 1/1343* (2006.01)
  *G02F 1/153* (2006.01)
  *G02F 1/155* (2006.01)
(52) U.S. Cl.
  CPC ...... *G02F 1/134327* (2013.01); *G02F 1/1533* (2013.01); *G02F 1/155* (2013.01)

(56) References Cited

U.S. PATENT DOCUMENTS

| | | | |
|---|---|---|---|
| 2004/0227462 A1 | 11/2004 | Utsumi et al. | |
| 2008/0264466 A1 | 10/2008 | Cuma | |
| 2012/0026573 A1 | 2/2012 | Collins et al. | |
| 2013/0057939 A1 | 3/2013 | Yeh et al. | |
| 2016/0168396 A1 | 6/2016 | Letocart et al. | |
| 2018/0281570 A1 | 10/2018 | Labrot et al. | |
| 2020/0061974 A1 | 2/2020 | Dröge et al. | |
| 2020/0299822 A1* | 9/2020 | Kim | G02F 1/153 |
| 2021/0078300 A1 | 3/2021 | Klein et al. | |
| 2021/0268774 A1 | 9/2021 | Klein et al. | |

FOREIGN PATENT DOCUMENTS

| | | |
|---|---|---|
| DE | 102004050987 A1 | 12/2005 |
| DE | 102005007427 A1 | 8/2006 |
| DE | 102005049081 B3 | 6/2007 |
| DE | 102007027296 A1 | 12/2008 |
| DE | 102008026339 A1 | 12/2009 |
| DE | 102013001334 A1 | 7/2014 |
| EP | 0876608 B1 | 4/2002 |
| EP | 1862849 A1 | 12/2007 |
| EP | 3456913 A1 | 3/2019 |
| JP | 2020003644 A | 1/2020 |
| JP | 2020510232 A | 4/2020 |
| JP | 2020536037 A | 12/2020 |
| JP | 2020536290 A | 12/2020 |
| KR | 20210022739 A | 3/2021 |
| WO | 2010/112789 A2 | 10/2010 |
| WO | 2010/147494 A1 | 12/2010 |
| WO | 2011/033313 A1 | 3/2011 |
| WO | 2011/101427 A1 | 8/2011 |
| WO | 2012/007334 A1 | 1/2012 |
| WO | 2014/072137 A1 | 5/2014 |
| WO | 2017/157626 A1 | 9/2017 |
| WO | 2019/055306 A1 | 3/2019 |
| WO | 2021/0557943 A1 | 4/2021 |

OTHER PUBLICATIONS

International Search Report for International Application No. PCT/EP2022/062428 filed on May 9, 2022 on behalf of Saint-Goban Glass France. Mail Date: Sep. 13, 2022. 5 Pages. (English Translation + German Original).

Written Opinion for International Application No. PCT/EP2022/062428 filed on May 9, 2022 on behalf of Saint-Goban Glass France. Mail Date: Sep. 13, 2022. 11 Pages. (English Translation + German Original).

* cited by examiner

SEGMENTED MULTILAYER FILM WITH ELECTRICALLY CONTROLLABLE OPTICAL PROPERTIES

CROSS-REFERENCE TO RELATED APPLICATIONS

The present application is the U.S. National Stage of International Patent Application No. PCT/EP2022/062428 filed on May 9, 2022, which, in turn, claims priority to European Patent Application No. 21180573.4 filed Jun. 21, 2021.

The invention relates to a multilayer film having electrically controllable optical properties, to a method for the production thereof and to the use thereof, and to a laminated pane comprising such multilayer film.

Glazings with electrically switchable optical properties are known. Such glazings comprise a functional element, which typically contains an active layer between two planar electrodes. The optical properties of the active layer can be changed by a voltage applied to the planar electrodes. One example of this is electrochromic functional elements known, for example, from US 20120026573 A1, WO 2010147494 A1, EP 1862849 A1 and WO 2012007334 A1. Another example is PDLC (polymer-dispersed liquid crystal) functional elements, which are known, for example, from DE 102008026339 A1. Another example is SPD (suspended particle device) functional elements, which are known, for example, from EP 0876608 B1 and WO 2011033313 A1. The optical properties which are electrically controlled are, in particular, the light transmission (as in the case of electrochromic or SPD functional elements) or the light scattering (as in the case of PDLC functional elements). Glazings with such functional elements can be electrically darkened in a convenient manner or provided with high light scattering.

Electrically switchable functional elements are frequently provided as multilayer films. The actual functional element is arranged between two polymeric carrier films. Such multilayer films enable simplified production of an electrically switchable glazing. Typically, the multilayer film is laminated between two glass panes using conventional methods, wherein a laminated pane having electrically switchable optical properties is produced. In particular, the multilayer films can be purchased commercially, so that the manufacturer of the glazing does not have to produce the switchable functional element per se.

Glazings having electrically switchable optical properties can be used, for example, as vehicle window panes, whose light transmission behavior can then be controlled electrically. They can be used, for example, as roof panels to reduce exposure to direct sunlight or disruptive reflections. Such roof panels are known, for example, from DE 10043141 A1 and EP 3456913 A1. Windshields have also been proposed in which an electrically controllable sun screen is realized by a switchable functional element in order to replace the conventional mechanically foldable sun screen in motor vehicles. Windshields with electrically controllable sun screens are known, for example, from DE 102013001334 A1, DE 102005049081 B3, DE 102005007427 A1 and DE 102007027296 A1.

JP2020003644A discloses a method, wherein a section is produced in a multilayer film by means of laser radiation in order to produce a contact area for a planar electrode. To this end, a carrier film, the planar electrode assigned to it and the active layer adjacent to the section are removed in an edge region, so that the other planar electrode is exposed and can be connected to an electrical cable.

It is also known to provide such glazings or the controllable functional elements with a plurality of switching regions, the optical properties of which can be switched independently of one another. For example, one region of the functional element can be selectively darkened or provided with a high level of light scattering, while other regions remain transparent. Reference is made merely by way of example to WO 2017157626 A1 and WO 2021057943 A1.

WO 2011101427 A1 discloses a method for producing an electrochromic functional element having electrochromic cells connected in series. The electrochromic functional element is applied to a glass substrate and the planar electrodes as well as the active layer sequence are segmented by laser radiation, for example. U.S. Pat. No. 5,910,854 A discloses a method for producing a segmented electrochromic multilayer film in which at least one planar electrode is segmented on a carrier film, for example by means of laser radiation, before the carrier films and the active layer sequence are laminated to form the multilayer film.

WO 2014072137 A1 discloses a method for producing a multilayer film having electrically controllable optical properties which is subdivided into a plurality of independently controllable segments. The multilayer film is provided as such. An insulation line is then introduced through a carrier film into a planar electrode or into both planar electrodes with laser radiation, in order to divide these into segments that are insulated from one another. The active layer between the planar electrodes is not segmented. The segments of the at least one planar electrode can be supplied with an electrical potential independently of one another in order to control the optical properties of the regions of the active layer located between them and the other planar electrode (or the segments of the other planar electrode) independently of one another. As a result of laser machining, thin insulation lines can advantageously be produced which are hardly noticeable. Also, the carrier film is not damaged, so that protection against corrosion and contamination is not impaired.

With multilayer films segmented in this way, problems can sometimes be observed in practice when a switching region is activated (i.e., subjected to a voltage), while an adjacent switching region is not activated (i.e., is voltage-free). The switching state of the activated switching region can quasi radiate into the non-activated switching region and, in particular at its edge region facing the activated switching region, cause an undesired change in the optical properties. This effect is also referred to as leakage or crosstalk. This effect is particularly pronounced in electrochromic multilayer films, presumably due to the semiconducting properties of the electrochromic layer sequence. Crosstalk effects can often be observed also in PDLC elements.

There is therefore a need for segmented multilayer films having electrically controllable optical properties in which the segments are completely decoupled from one another. In particular, no change in the optical properties should occur in voltage-free segments, even if a directly adjacent segment is activated. There is also a need for production methods for such multilayer film. The object of the present invention is to provide such improved multilayer films and a method of producing them.

The object of the invention is achieved by a multilayer film having electrically controllable optical properties, at least comprising in the order specified and arranged one above the other in a planar manner:
   a) a first carrier film,
   b) a first planar electrode,
   c) an active layer or layer sequence having electrically controllable optical properties,
   d) a second planar electrode and
   e) a second carrier film.

According to the invention, at least the first planar electrode and the active layer or the active layer sequence are divided by at least one insulation line into at least two segments that are electrically insulated from one another. According to the invention, the at least one insulation line is introduced by a laser through one of the carrier films at least into the first planar electrode and the active layer or active layer sequence. Optionally, the second planar electrode is also divided by the at least one insulation line into at least two segments that are electrically insulated from one another, wherein the at least one insulation line is introduced with the laser through one of the carrier films into the first planar electrode, the active layer or layer sequence and the second planar electrode.

The object of the invention is also achieved by a method for producing a multilayer film having electrically switchable optical properties. First, a multilayer film having electrically controllable optical properties is provided (method step A), which in the order specified and arranged one above the other in a planar manner comprises at least:
   a) a first carrier film,
   b) a first planar electrode,
   c) an active layer or layer sequence having electrically controllable optical properties,
   d) a second planar electrode and
   e) a second carrier film.

The radiation of a laser is then directed onto the multilayer film, in particular through a carrier film onto the first planar electrode, the active layer or the active layer sequence and the second planar electrode (method step B). The radiation of the laser is then moved along at least one line, wherein at least one insulation line (through the carrier film) is introduced at least into the first planar electrode and the active layer or active layer sequence (method step C), so that at least the first planar electrode and the active layer or active layer sequence are divided into at least two segments electrically insulated from one another. Optionally, the at least one insulation line can also be introduced into the second planar electrode in method step C, so that the second planar electrode is also divided into at least two segments that are electrically insulated from one another.

The first planar electrode and the active layer/layer sequence (and in some embodiments also the second planar electrode) are divided by the at least one insulation line into at least two segments that are electrically insulated from one another. Each of said segments forms an independently controllable switching region of the multilayer film. Independently controllable switching region means a region of the multilayer film, the optical properties of which can be controlled independently of the other switching regions. The switching regions separated from one another by the insulation line thus have all structural features of the multilayer film, i.e., the two carrier films, the two planar electrodes and the active layer/layer sequence. No components of the film are removed adjacent to the insulation line, as would be the case, for example, if one of the carrier films, the planar electrode assigned to it and the active layer/layer sequence adjacent to the insulation line would be removed to locally expose the other planar electrode in order to provide a contact area in which it can be connected to an external electrical cable.

The first planar electrode within the meaning of the invention is the planar electrode which faces the laser in the method according to the invention, while the second planar electrode faces away from the laser. The laser radiation thus enters the multilayer film through the first carrier film and exits it again through the second carrier film.

The multilayer film and the method are described together below, wherein explanations and preferred embodiments relate equally to multilayer film and method. If preferred features are described in connection with the method, this means that the multilayer film is preferably designed accordingly. If, on the other hand, preferred features are described in connection with the multilayer film, this means that the method is also preferably carried out accordingly.

The advantage of the invention lies in the insulation line which extends over at least the first planar electrode and the active layer or layer sequence. In contrast to conventional segmented multilayer films, in which only one planar electrode or both planar electrodes are segmented by insulation lines, wherein the active layer or layer sequence is not affected by the segmentation, complete decoupling of the segments is achieved thereby. In segments which are to be voltage-free, an undesired change in the optical properties cannot thereby be caused by adjacent active segments (i.e., segments that are subjected to electrical voltage). The insulation line introduced with laser radiation is thin and therefore visually inconspicuous. During processing, the carrier films remain uninjured, so that planar electrodes and active layer(s) continue to be protected against corrosion, moisture and contamination. The at least one insulation line therefore does not extend through the carrier films. Optionally, the insulation line can also extend over the second planar electrode, whereby a further improved decoupling of the segments can be achieved.

The multilayer film is a layer stack, wherein the layers of the layer stack comprise at least one first carrier film, a first planar electrode, an active layer or an active layer sequence, a second planar electrode, and a second carrier film, which are arranged in a planar manner one above the other in this order. The layers of the layer stack are permanently connected to one another in a stable manner, for example by gluing or lamination. The multilayer film is thus provided as a pre-laminated multilayer film, i.e., the carrier films, the planar electrodes and the active layer or layer sequence are already bonded to form the multilayer film before the insulation line is produced. The at least one insulation line is introduced into this pre-laminated multilayer film by laser radiation, i.e., after the bonding of the carrier films, the planar electrodes and the active layer to form the multilayer film. Multilayer films of this type are typically commercially available and can be purchased, for example, by a glass manufacturer, cut to the required size and processed according to the invention. However, it is also possible for the multilayer film to be produced before the processing itself.

According to the invention, the first planar electrode and the active layer or the active layer sequence (and optionally the second planar electrode) are divided by at least one insulation line into at least two segments that are electrically insulated from one another. The at least one insulation line according to the invention extends at least over the first planar electrode and the active layer(s), so that the first planar electrode and the active layer(s) are each divided into at least two segments (partial regions) that are electrically insulated from one another. In other words, both the first planar electrode and the active layer(s) (and optionally the second planar electrode) each have an insulation line, wherein said insulation lines are arranged congruently with one another. As a result of the electrical insulation, electrical charges cannot be transmitted or at least not transmitted to a significant extent from one segment into an adjacent segment. The insulation line is a linear, electrically non-conductive region formed in the first planar electrode and the active layer or layer sequence (and optionally the second planar electrode).

In one embodiment of the invention, only the first planar electrode and the active layer or layer sequence are divided by the at least one insulation line into at least two segments that are electrically insulated from one another, while the second planar electrode is not divided into segments by the insulation line. The at least one insulation line can leave the second planar electrode completely intact (i.e., extend not at all into the second planar electrode) or can partially extend over the second planar electrode, so that the latter is not divided into electrically insulated segments. The insulation line can extend, for example, over less than 50% of the layer thickness of the second planar electrode, preferably less than 30%, particularly preferably less than 20%.

In a further embodiment of the invention, both planar electrodes and the active layer or layer sequence are divided by the at least one insulation line into at least two segments that are electrically insulated from one another.

According to the invention, the insulation line is introduced into the first planar electrode and into the active layer or layer sequence (and optionally the second planar electrode) by means of a laser. The insulation line is produced by laser-induced degeneration. Such laser-induced degeneration is, for example, the removal or a chemical modification of said layers. Laser-induced degeneration results in an interruption of the electrical conductivity of the layer.

In a preferred embodiment, said segments or partial regions of the first planar electrode and of the active layer(s) (and optionally of the second planar electrode) are completely materially separated from one another by the insulation line. The insulation line thus runs in each case completely through the first planar electrode and the active layer(s) (and optionally the second planar electrode), in each case over their entire layer thickness. Electrical insulation is then particularly efficient. Material separation means that the material of the planar electrodes is not present in the region of the insulation line, i.e., it is either removed or chemically modified to an electrically non-conductive material (for example, oxidized) as a result of the laser radiation. In principle, however, it is also conceivable for the layer thickness of one or more of said elements to be reduced only locally by the insulation line, so that the electrical conductivity is reduced such that no charges are transmitted to a significant extent. The insulation line then does not extend over the entire layer thickness of said element, but, for example, only over at least 80% or at least 90% of the layer thickness.

In a preferred embodiment, the laser radiation is moved exactly once along the at least one line. If several insulation lines are to be produced, the laser radiation is moved exactly once along a line. In this case, the at least one insulation line is introduced simultaneously into the first planar electrode and into the active layer or layer sequence (and optionally the second planar electrode). The method according to the invention is suitable for such time-saving generation of the insulation line(s), in particular by a suitable choice of the laser radiation parameters (in particular wavelength, power density, speed of movement). In an alternative embodiment, however, it is also possible to move the laser radiation twice or several times along the at least one line, wherein the complete insulation line, i.e., the complete electrical insulation of the segments of the planar electrode or planar electrodes and of the active layer or layer sequence, is gradually generated in several cycles.

The line width of the insulation line according to the invention can be, for example, less than or equal to 500 μm. In a preferred embodiment of the invention, the line width is from 10 μm to 150 μm, particularly preferably from 20 μm to 100 μm. Particularly good results are achieved in this region for the line width. On the one hand, the insulation line is wide enough to result in an effective interruption of the layers. On the other hand, the line width is advantageously low to be visible only slightly for an observer. Insulation lines with these small line widths can only be realized with difficulty or not at all with mechanical machining methods. In the method according to the invention, the line width can be adjusted in particular by the expansion of the focus of the laser radiation and by the power of the laser radiation.

The active layer or layer sequence has the variable optical properties which can be controlled by a voltage applied to the active layer via the planar electrodes. By applying voltage to the planar electrodes or by changing the voltage applied to the planar electrodes, the optical properties of the active layer or layer sequence can be controlled. The variable optical properties relate in particular to the degree of light transmission and/or the degree of light scattering, wherein light within the meaning of the invention is understood in particular to mean visible light in the spectral range from 380 nm to 780 nm. In the context of the invention, electrically controllable optical properties are understood, in particular, to mean such properties which are continuously controllable. In the context of the invention, the switching state of the multilayer film means the extent to which the optical properties are changed compared to the voltage-free state. A 0% switching state corresponds to the voltage-free state while a 100% switching state corresponds to the maximum change in optical properties. Between the two aforementioned states, all switching states can be continuously realized by selecting the voltage accordingly. A 20% switching state corresponds, for example, to a change in the optical properties by 20% of the maximum change. Said optical properties relate in particular to the light transmission and/or the scattering behavior. In principle, however, it is also conceivable that the electrically controllable optical properties can only be switched between two discrete states. In that case, only two switching states exist—namely 0% and 100%. It is also conceivable that the electrically controllable optical properties can be switched between more than two discrete states.

The two planar electrodes and the active layer or layer sequence lying in between form the actual electrically controllable functional element of the multilayer film according to the invention. The functional element can in principle be any functional element having electrically controllable optical properties that is known per se to a person skilled in the art. The configuration of the active layer or layer sequence depends on the type of functional element.

In a particularly preferred embodiment, the multilayer film according to the invention is an electrochromic multilayer film, and the functional element is an electrochromic functional element. Electrochromic functional elements contain an active layer sequence between the planar electrodes (electrochromic layer sequence). The active layer or layer sequence according to the invention is therefore an electrochromic active layer sequence. The active layer sequence comprises in the order specified and arranged one above the other in a planar manner:
- an ion storage layer,
- an electrolyte layer and
- an electrochromic layer.

The at least one insulation line extends through all layers of the layer sequence and divides them into electrically separate segments in each case. The ion storage layer is preferably facing the first planar electrode and is particularly preferably in direct tactile contact with it, while the electrochromic layer faces the second planar electrode and is, in particular, in direct tactile contact with it.

The electrochromic layer is the actual carrier of the electrically controllable optical properties. It is an electrochemically active layer, the light transmission of which depends on the degree of storage of ions. The ions (for example $H^+$-, $Li^+$, $Na^+$- or $K^+$ ions) are stored in and provided by the ion storage layer. The electrolyte layer spatially separates the electrochromic layer from the ion storage layer and serves for ion migration. If a DC voltage of suitable polarity is applied to the planar electrodes, ions from the ion storage layer migrate through the electrolyte layer into the electrochromic layer, whereupon the optical properties (color, light transmission) of the electrochromic layer are changed depending on the extent of the ions that have migrated in. If DC voltage of opposite polarity is applied to the planar electrodes, the ions migrate back from the electrochromic layer and through the electrolyte layer into the ion storage layer, and the optical properties of the electrochromic layer change in the opposite manner. If no voltage is applied to the planar electrodes, the current state remains stable. Suitable electrochromic layers contain electrochromic materials, for example inorganic oxides (such as tungsten oxide or vanadium oxide), complex compounds (such as Berlin blue) or conductive polymers (such as 3,4-polyethylenedioxythiophene (PEDOT) or polyaniline). Electrochromic functional elements are known, for example, from WO 2012007334 A1, US 20120026573 A1, WO 2010147494 A1 and EP 1862849 A1. The electrolyte layer is typically designed as a film of organic or inorganic, electrically insulating material with high ion conductivity, for example based on lithium phosphorus oxynitride. The ion storage layer is either permanently transparent (pure ion storage) or has electrochromic behavior that is contrary to the electrochromic layer. One example of a pure ion storage is layers containing a mixed oxide of titanium and cerium; examples of anodically electrochromic ion storage layers are layers containing iridium oxide or nickel oxide.

Experience has shown that with conventional segmented electrochromic multilayer films, one can particularly frequently observe that switching states of individual segments have an undesired effect on adjacent segments and cause an undesired change in the optical properties there. The inventors assume that this is due to the fact that the active layer sequence of electrochromic multilayer films has semiconducting properties, which particularly favors a transfer of charges. This disruptive effect can be effectively prevented by the insulation line according to the invention, so that the invention has a particularly advantageous effect on electrochromic multilayer films.

It has been shown that in electrochromic multilayer films a complete decoupling of the segments is achieved already when only the first planar electrode and the active layer sequence are each divided by the at least one insulation line into segments that are insulated from one another. Segmentation of the second planar electrode is not mandatory for this purpose and is therefore omitted in a preferred embodiment. The insulation line therefore preferably does not extend or extends only partially through the second planar electrode (preferably over less than 50% of its layer thickness, particularly preferably less than 30%, in particular less than 20%). Optionally, however, the insulation lines can also extend over the second planar electrode, so that the latter is also divided into separate segments in order to further improve decoupling.

With electrochromic multilayer films, very particularly good results are achieved if the width of the insulation line is from 30 µm to 50 µm.

In a further preferred embodiment, the multilayer film according to the invention is a PDLC multilayer film, and the functional element is a PDLC (polymer dispersed liquid crystal) functional element. PDLC functional elements contain an active layer between the planar electrodes. The active layer or layer sequence according to the invention is thus designed as an active layer. The active layer is a PDLC layer and contains liquid crystals which are embedded in a polymer matrix. PDLC functional elements are typically operated with AC voltage. If no voltage is applied to the planar electrodes, the liquid crystals will be aligned in an unordered manner, which results in strong scattering of the light passing through the active layer. If a voltage is applied to the planar electrodes, the liquid crystals will align in a common direction and the transmission of light through the active layer is increased. Such a functional element is known, for example, from DE 102008026339 A1. The term PDLC is to be interpreted broadly within the meaning of the invention and includes related functional elements which are based on the alignment of liquid crystals, for example PNLC (polymer networked liquid crystal) functional elements.

It has been found that in the case of PDLC multilayer films particularly good results are achieved when the first planar electrode, the active layer and the second planar electrode are divided by the at least one insulation line into segments that are electrically insulated from one another. Although independent switching regions can be produced by only segmenting the first planar electrode and the active layer through the insulation line, the segments of the first planar electrode are then electrically controlled independently of one another, while the second planar electrode does not have an insulation line and overall forms the counter electrode for all segments of the first planar electrode (reference potential). If a voltage is applied to one or more of the switching regions, this results in a current flow through the active layer in the respective switching region, which in turn leads to a shift of potential in the non-segmented planar electrode due to the latter's electrical resistance. This effect is particularly pronounced because typical planar electrodes have a comparatively high electrical resistance (the planar electrodes cannot be selected with respect to an optimal electrical conductivity, since they must be transparent to ensure vision-ITO layers are typically used as planar electrodes which have comparatively low conductivity or a comparatively high electrical resistance). This effect is also referred to as ground shift (shift of the reference potential). As a result, a certain voltage is now also generated in those switching regions which are actually not to be switched, which then likewise change their optical properties to a certain extent without this being desired. As a result of the segmentation of also the second planar electrode, a separate reference electrode is formed for each switching region, so that a ground shift and the associated crosstalk can advantageously be avoided.

With PDLC multilayer films, very particularly good results are achieved if the width of the insulation line is less than 80 μm, for example from 30 μm to 80 μm, preferably from 50 μm to 80 μm.

In a further embodiment, the multilayer film according to the invention is an SPD multilayer film, and the functional element is an SPD (suspended particle device) functional element. SPD functional elements contain an active layer between the planar electrodes. The active layer contains suspended particles which are preferably embedded in a viscous matrix. The absorption of light through the active layer is variable by applying a voltage to the planar electrodes, which leads to a change in orientation of the suspended particles. Such functional elements are known, for example, from EP 0876608 B1 and WO 2011033313 A1.

In a further embodiment, the multilayer film is an electroluminescent multilayer film, and the functional element is an electroluminescent functional element. The active layer contains electroluminescent materials which can be inorganic or organic (OLED). Luminescence of the active layer is excited by applying a voltage to the planar electrodes. Such functional elements are known, for example, from US 2004227462 A1 and WO 2010112789 A2.

The planar electrodes are provided to be electrically connected to at least one external voltage source in a manner known per se. The electrical connection is established by suitable connecting cables, for example foil conductors, which are optionally connected to the planar electrodes via so-called busbars, for example strips of an electrically conductive material or electrically conductive imprints. The connecting cables can be attached to the electrically conductive layers before or after introducing the electrically non-conductive line according to the invention, for example by soldering, gluing or insertion into the multilayer film.

The planar electrodes are preferably transparent, which in the context of the invention means that they have a light transmittance in the visible spectral range of at least 50%, preferably at least 70%, particularly preferably at least 80%. The planar electrodes are in particular electrically conductive thin films or thin-film stacks. The planar electrodes preferably contain at least one metal, a metal alloy or a transparent conducting oxide (TCO). The planar electrodes particularly preferably contain at least one transparent conductive oxide. The planar electrodes can be formed, for example, on the basis of silver, gold, copper, nickel, chromium, tungsten, indium tin oxide (ITO), gallium-doped or aluminum-doped zinc oxide and/or fluorine-doped or antimony-doped tin oxide, preferably on the basis of silver or ITO, in particular ITO. The planar electrodes preferably have a thickness of 10 nm to 2 μm, particularly preferably of 20 nm to 1 μm, very particularly preferably of 30 nm to 500 nm, and in particularly of 50 nm to 200 nm. If a thin film is formed based on a material, this means that, according to the invention, the layer consists largely of the material (more than 50 wt. %, preferably more than 90 wt. %, particularly more than 99 wt. %), wherein the layer can contain other materials to a small extent, for example doping.

The carrier films preferably contain at least one thermoplastic polymer or are formed on the basis thereof, particularly preferably polyethylene terephthalate (PET), polypropylene, polyvinyl chloride, fluorinated ethylene propylene, polyvinyl fluoride or ethylene tetrafluoroethylene, very particularly preferably PET. This is particularly advantageous with regard to the stability of the multilayer film. The thickness of each carrier film is preferably 0.1 mm to 1 mm, particularly preferably 0.1 mm to 0.5 mm, in particular 0.1 mm to 0.2 mm. On the one hand, a small thickness of the glazing in which the multilayer film is to be used is achieved by carrier films with such a small thickness. On the other hand, effective protection of the active layer and of the electrically conductive layers is ensured. In the method according to the invention, the carrier films are preferably not damaged, i.e., the insulation line does not extend on the carrier films. If a polymeric layer is formed on the basis of a material, this means according to the invention that the layer is largely composed of the material (more than 50 wt. %), wherein the layer can contain other materials, for example plasticizers, stabilizers or UV blockers.

The side edge of the multilayer film can be sealed, for example by merging the carrier films or by a (preferably polymeric) tape. The active layer can thus be protected, in particular from constituents (in particular plasticizers) of the intermediate layer of a laminated pane, in which the multilayer film is embedded, diffusing into the active layer, which can lead to degradation of the functional element.

In addition to the active layer or layer sequence, the planar electrodes and the carrier films, the multilayer film can have further layers known per se, for example barrier layers, blocker layers, anti-reflection or reflection layers, protective layers and/or smoothing layers.

The radiation of a laser is directed onto the multilayer film and enters the multilayer film through a carrier film. It irradiates the first planar electrode and the active layer or layer sequence (and optionally the second planar electrode) in order to introduce the insulation line(s) according to the invention into these elements and to divide them into segments which are (at least largely) electrically insulated from one another. For this purpose, the laser radiation is moved along at least one line, wherein the at least one insulation line is produced.

The radiation of the laser is preferably focused on the multilayer film by means of at least one optical element, for example a lens or an objective. The laser radiation can be focused, for example, on the carrier film facing the laser, on the first planar electrode facing the laser or on the surface of the active layer or layer sequence facing the laser. f-theta lenses or f-theta objectives are particularly suitable. These result in the foci of the laser radiation being arranged in one plane at different exit angles and enabling a constant movement speed of the laser radiation over the multilayer film.

The focal length of the focusing element determines the extent of the focus of the laser radiation. The focal length of the focusing optical element is preferably from 5 cm to 100 cm, particularly preferably from 10 cm to 40 cm. Particularly good results are thus achieved. A smaller focal length of the optical element requires a too small working distance between the multilayer film and the optical element. A larger focal length leads to a too large extension of the laser focus, thereby limiting the resolution capacity of the structuring method and the power density in focus.

Between the laser and the focusing optical element, the radiation of the laser can be guided through at least one optical fiber, for example a glass fiber. Further optical elements can also be arranged in the beam path of the laser, for example collimators, apertures, filters or elements for frequency doubling.

The insulation line is produced by a movement of the radiation of the laser relative to the multilayer film. In an advantageous embodiment, the multilayer film is stationary during introduction of the insulation line, and the radiation of the laser is moved over the planar electrode(s) and the active layer(s). The movement of the radiation of the laser is preferably effected by at least one mirror which is connected to a movable component. The mirror can be tilted in two directions, preferably two directions orthogonal to one another, particularly preferably horizontally and vertically, by means of the movable component. The movement of the radiation of the laser can also be effected by a plurality of mirrors each connected to a movable component. For example, the radiation of the laser can be moved by two mirrors, wherein a mirror can be tilted in the horizontal direction and the other mirror can be tilted in the vertical direction. Alternatively, the movement of the radiation of the laser can be effected by a movement of the focusing element and the laser or by a movement of the focusing element and an optical fiber over the stationary multilayer film. Alternatively, the radiation of the laser can be stationary and the multilayer film can be moved to introduce the insulation line.

The radiation of the laser is preferably moved over the multilayer film at a rate of 100 mm/s to 10000 mm/s, particularly preferably of 200 mm/s to 5000 mm/s, very particularly preferably of 300 mm/s to 2000 mm/s, for example of 500 mm/s to 1000 mm/s. Particularly good results are thus achieved.

The wavelength of the laser radiation, by means of which the electrically conductive line is introduced into the electrically conductive layer, is to be suitably selected such that the planar electrodes and the active layer(s) show sufficiently high absorption of the laser radiation and that the carrier films show sufficiently low absorption of the laser radiation. As a result, the line is advantageously introduced selectively into the functional element without damaging the carrier films.

The wavelength is preferably in the range from 200 nm to 1200 nm. It is particularly preferred to use laser radiation in the UV range or in the visible range, preferably from 200 nm to 600 nm, particularly preferably from 300 nm to 550 nm.

It has been found that the best results are achieved with laser radiation in the ultraviolet spectral range (UV range). The wavelength of the laser radiation is preferably from 200 nm to 400 nm, more preferably from 300 nm to 400 nm, for example 343 nm. For example, frequency-tripled or twice frequency-doubled solid lasers (for example, Nd:YAG lasers or Yb:YAG lasers), diode lasers, excimer lasers or dye lasers can be used for this purpose. The use of laser radiation in the UV range is particularly advantageous in particular if the multilayer film is an electrochromic multilayer film.

However, satisfactory results can also be achieved with laser radiation in the visible spectral range, in particular substantially in the green spectral range. The wavelength of the laser radiation is preferably from 500 nm to 600 nm, particularly preferably from 510 nm to 550 nm, very particularly preferably from 510 nm to 530 nm, for example 515 nm. For example, twice frequency-doubled solid lasers (for example, Nd:YAG lasers or Yb:YAG lasers), diode lasers or dye lasers can be used for this purpose.

In the alternative, satisfactory results can also be achieved with laser radiation in the infrared spectral range (IR range), in particular in the near IR range. The wavelength of the laser radiation is preferably from 800 nm to 1200 nm, particularly preferably from 950 nm to 1100 nm, very particularly preferably from 1000 nm to 1050 nm, for example 1030 nm. For example, solid lasers (for example, Nd:YAG lasers (1064 nm) or Yb:YAG lasers (1030)), diode lasers (for example, InGaAs lasers) or gas lasers can be used for this purpose. The use of laser radiation in the IR range is particularly advantageous in particular if the multilayer film is a PDLC multilayer film.

The degree of absorption of the planar electrodes into which the insulation line is to be introduced compared to the laser radiation is preferably greater than or equal to 0.1%, particularly preferably greater than or equal to 0.3%, for example from 0.3% to 20%. The degree of absorption is very particularly preferably greater than or equal to 5%, and in particular greater than or equal to 10%. The degree of absorption of the carrier films compared to the laser radiation is preferably less than or equal to 15%, particularly preferably less than or equal to 10%, very particularly preferably less than or equal to 7%.

In a particularly advantageous embodiment, the ratio of the absorption of the planar electrodes and the active layer(s) to the absorption of the carrier films at the laser radiation's wavelength is greater than or equal to 0.5, particularly preferably greater than or equal to 1, very particularly preferably greater than or equal to 1.5 and in particular greater than or equal to 2. This results in an advantageously selective introduction of the insulation line.

The laser is preferably operated in pulsed mode. This is particularly advantageous with regard to a high power density and effective introduction of the insulation line. The pulse frequency is preferably greater than 100 kHz, particularly preferably from 100 kHz to 1000 kHz. The pulse length is preferably less than or equal to 50 ns, particularly preferably from 100 fs to 30 ns. This is particularly advantageous with regard to the power density of the laser during laser structuring. If the multilayer film is an electrochromic multilayer film, particularly good results are achieved with a pulse length of 1 ns to 25 ns. If the multilayer film is a PDLC multilayer film, particularly good results are achieved with a pulse length of 100 fs to 1 ps.

The output power of the radiation of the laser is preferably from 0.1 W to 50 W, for example from 0.3 W to 10 W. The required output power is, in particular, dependent on the wavelength of the laser radiation used and the degree of absorption of the layers to be separated and can be determined by the person skilled in the art by simple tests. It has been found that the power of the laser radiation affects the line width of the insulation line, a higher power leading to a larger line width.

The invention also comprises the use of a multilayer film according to the invention in glazings, in particular in laminated panes, in buildings, for example in the access or window region, or in means of transport for traffic on land, in the air or on water, in particular in trains, ships, aircraft and motor vehicles, for example as a rear pane, side pane and/or roof panel.

The invention also comprises a laminated pane, wherein at least one multilayer film according to the invention is arranged between two panes in a planar manner. The multilayer film is preferably embedded in the intermediate layer of the laminated pane. For this purpose, each carrier film is preferably connected to one of the panes via at least one thermoplastic bonding film. Bonding takes place under the action of heat, vacuum and/or pressure according to methods known per se. The thermoplastic bonding films comprise at least one thermoplastic polymer, for example ethylene vinyl acetate (EVA), polyvinyl butyral (PVB) or polyurethane (PU), particularly preferably PVB. The thickness of the thermoplastic bonding films is preferably from 0.25 mm to 2 mm, for example the standard thicknesses 0.38 mm or 0.76 mm. The two aforesaid bonding films on both sides of the multilayer film preferably project circumferentially beyond the multilayer film. The side edges of the multilayer film is are particularly preferably surrounded circumferentially by a frame-like third thermoplastic bonding film. It has a recess into which the multilayer film is inserted.

The panes are preferably made of glass, particularly preferably soda lime glass, or of rigid clear plastics, for example polycarbonate (PC) or polymethyl methacrylate (PMMA). The panes can be clear and transparent or tinted or colored. The thickness of the panes can vary widely and thus be adapted to the requirements in the individual case. The thickness of each pane is preferably from 0.5 mm to 15 mm, particularly preferably from 1 mm to 5 mm. The laminated pane can have any three-dimensional shape. The laminated pane is preferably flat or slightly or strongly curved in one direction or in several directions of the space.

The at least one insulation line according to the invention can be provided for various purposes. In a first preferred embodiment, the insulation line serves to divide the planar electrodes and the active layer or layer sequence into at least two electrically insulated segments (partial regions), wherein an independent switching region of the multilayer film is formed by each segment. In a laminated pane, each switching region of the multilayer film then again forms an independent switching region of the laminated pane. The planar electrodes of each segment are provided to be connected to a voltage source independently of one another, so that an electrical voltage can be applied to each segment independently of the other in order to control its optical properties independently of the other segments. For this purpose, each planar electrode of each segment is contacted with an electrical cable, preferably via so-called busbars, which electrical cable extends beyond the side edge of the multilayer film and out of the latter and, if the multilayer film is laminated in a laminated pane, extends beyond the side edge of the laminated pane and out of the latter. The at least one insulation line can have different shapes, depending on the application purpose:

The at least one insulation line can extend from one side edge of the multilayer film to another side edge, in particular the opposite side edge. If a plurality of insulation lines is present, they preferably run substantially parallel to one another. Thus, switching regions of a laminated pane can be produced which extend from one side edge to the opposite side edge and are arranged substantially parallel to one another.

The multilayer film can, for example, form an electrically controllable sun screen of a windshield, which has a plurality of switching regions arranged substantially horizontally (parallel to the roof edge), so that the user generally can darken a continuous region of the sun screen, which adjoins the side edge of the multilayer film facing the upper edge (roof edge) of the windshield, or can provide it with high light scattering, the extent of which depends on the position of the sun. For example, a roof panel can be realized in an alternative application which has switching regions each running between the side edges of the roof panel and having a different distance from the front edge or rear edge. Depending on the position of the sun, the vehicle occupants can then darken different switching regions of the roof panel or provide them with high light scattering. Another exemplary application possibility is the production of large glazings of an open plan office, wherein the optical properties in the region of the various workstations can be switched independently of one another.

In one development, it is also possible for at least one first insulation line to run between a pair of opposite side edges of the multilayer film and at least one second insulation line between the other pair of opposite side edges. The at least two insulation lines then extend crosswise and divide the functional element into at least four independent switching regions. For example, a roof panel can be realized, wherein each vehicle occupant (driver, front passenger, two rear passengers) is assigned a separate switching region, which is located above the occupant and the optical properties of which can be controlled independently by the respective occupant.

The at least one insulation line can have a closed shape, for example designed as a geometric figure, pictograph, letter, number or symbol. The geometric figure, pictograph, letter, number or symbol can be made visible in an aesthetically appealing manner by a suitable selection of the switching states.

The at least one insulation line can originate from a side edge of the multilayer film, describe a defined shape and extend back to the same side edge. The defined shape can again be, for example, a geometric figure, pictograph, letter, number or symbol which can be made visible by a suitable selection of the switching states. Compared to the above-described embodiment with the insulation line as a closed form, this embodiment has the advantage that the switching region with the defined shape extends all the way to the aforesaid side edge of the multilayer film, where it can be electrically contacted in a visually inconspicuous manner.

In a second preferred embodiment, the insulation line serves to divide the planar electrodes and the active layer or layer sequence into at least two electrically insulated segments (partial regions), wherein at least one segment is provided as an independent switching region and at least one segment is provided as a region with constant, non-variable optical properties. The planar electrodes of those segments that are intended to form switching regions are provided to be connected to a voltage source independently of one another, so that an electrical voltage can be applied to each switching region (in case of a plurality of switching regions: independently of the other), in order to control its optical properties independently of the other segments. The at least one insulation line can again have different shapes, for example extend between two side edges. Preferably, the at least one insulation line has a closed shape, for example designed as a geometric figure, pictograph, letter, number or symbol. The geometric figure, pictograph, letter, number or symbol can be made visible in an aesthetically appealing manner by a suitable selection of the switching states. Therefore, the multilayer film is not affected by a switching of the optical properties in the non-controllable segment. The shape formed by the non-controllable segment is thus made visible in an aesthetically appealing manner.

The invention is explained in more detail with reference to a drawing and exemplary embodiments. The drawing is a schematic representation and is not true to scale. The drawing does not limit the invention in any way. Shown are:

Figure 1:
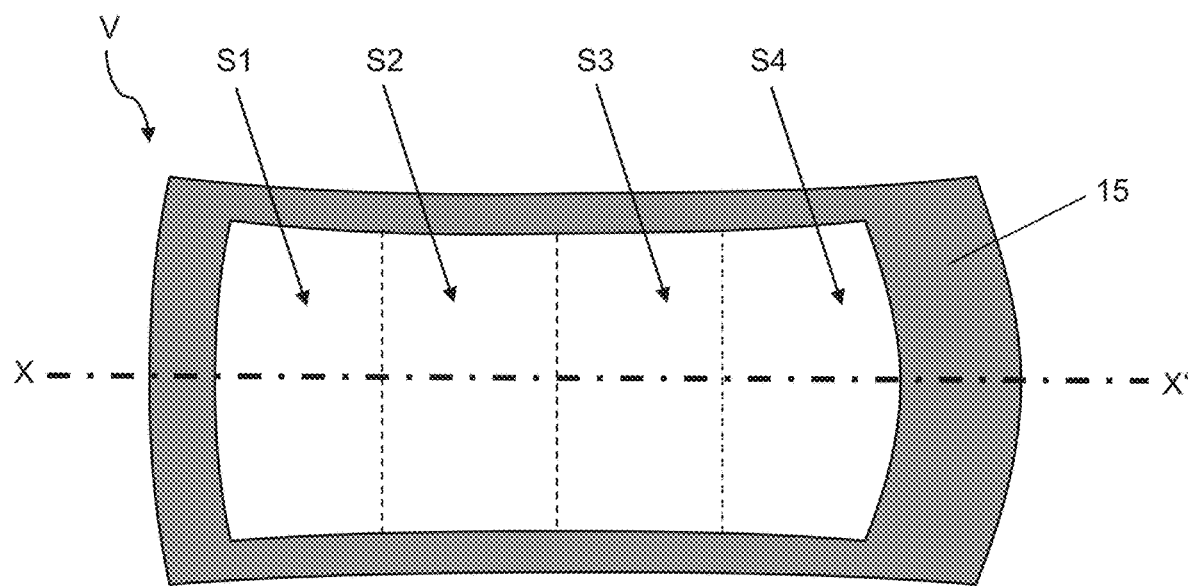
FIG. 1 shows a plan view of an embodiment of a laminated pane according to the invention, comprising a multilayer film according to the invention.
Figure 2:
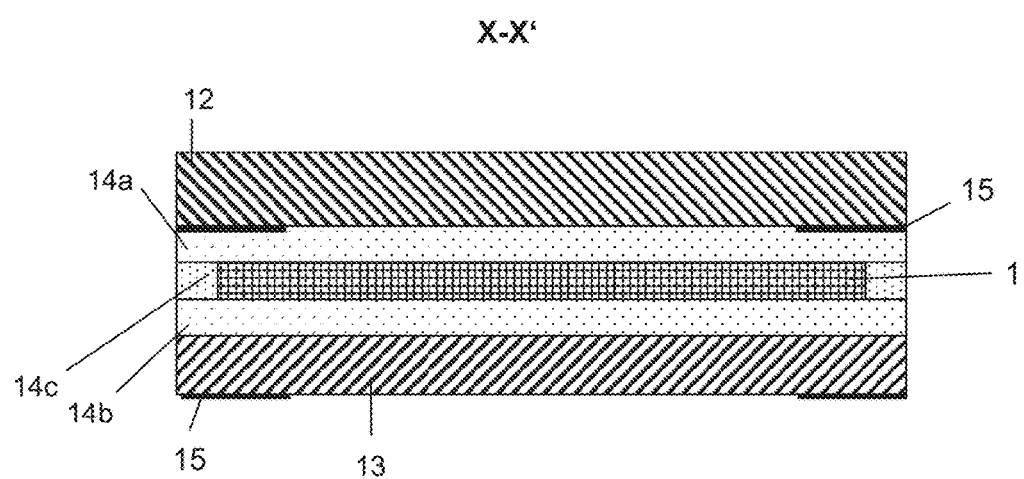
FIG. 2 shows a cross-section along X-X' through the laminated pane according to FIG. 1.
Figure 8:
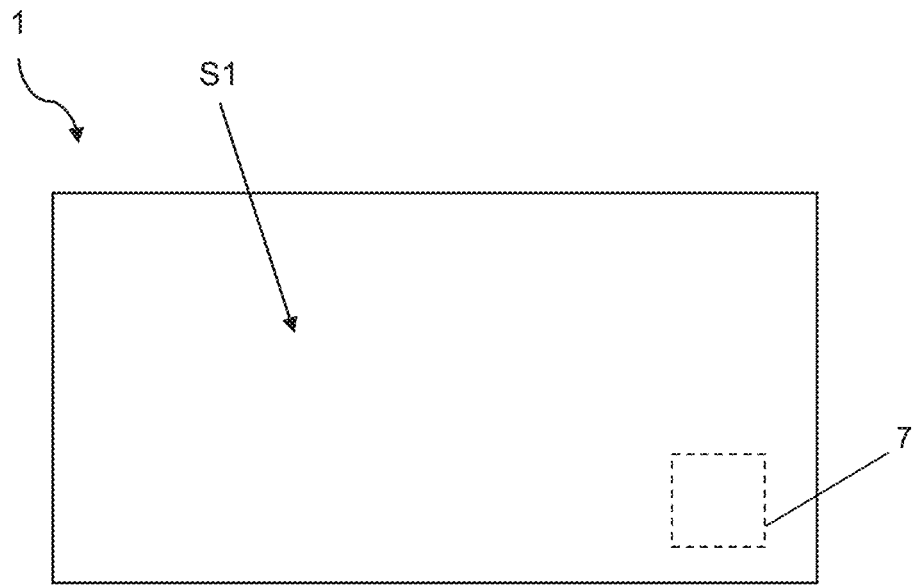
Figure 9:
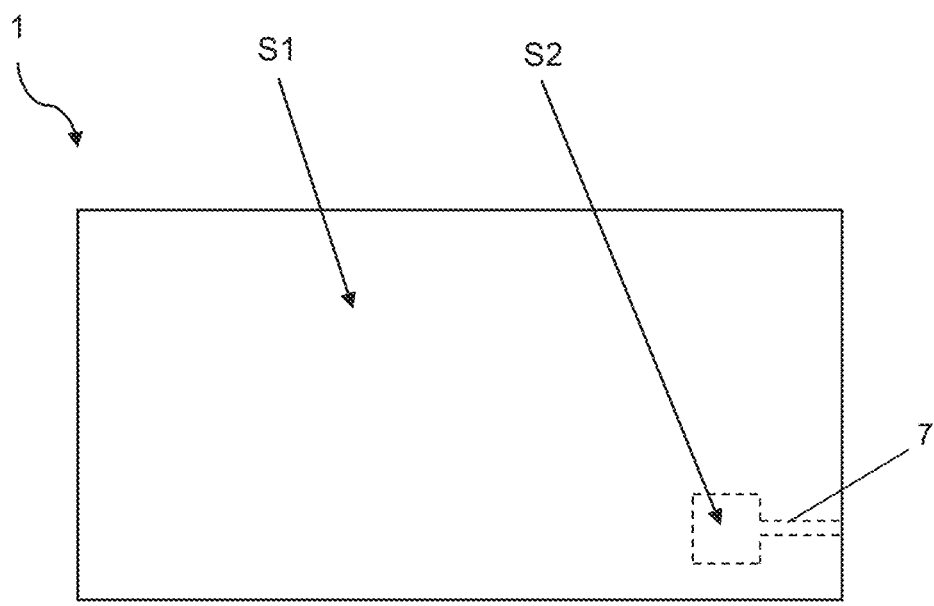

FIG. 8 shows a plan view of a further embodiment of the multilayer film according to the invention; and FIG. 9 shows a plan view of a further embodiment of the multilayer film according to the invention, FIGS. 1 and 2 each show a detail of a laminated pane according to the invention having electrically controllable optical properties. The laminated pane is provided, for example, as a roof panel of a passenger vehicle, the light transmission of which can be electrically controlled in regions. The laminated pane comprises a first pane 12 (outer pane) and a second pane 13 (inner pane), which are connected to one another by a thermoplastic intermediate layer. The first pane 12 and the second pane 13 consist of soda lime glass, which can optionally be tinted. For example, the first pane 12 has a thickness of 2.1 mm, and the second pane 13 has a thickness of 1.6 mm.

The intermediate layer comprises a total of three thermoplastic layers 14*a*, 14*b*, 14*c* which are each formed by a thermoplastic film having a thickness of 0.38 mm and made of PVB. The first thermoplastic layer 14*a* is connected to the first pane 12, and the second thermoplastic layer 14*b* is connected to the second pane 13. The third thermoplastic layer 14*c* located in between has a cutout in which a multilayer film 1 having electrically controllable optical properties is inserted essentially in a precise fit, i.e., approximately flush on all sides. The third thermoplastic layer 14*c* thus forms quasi some kind of mount or frame for the approximately 0.3 mm thick multilayer film 1, which is thickened to approximately 0.4 mm in the edge region by the busbars used for electrical contacting. The multilayer film 1 is thus completely encapsulated in the thermoplastic material and protected thereby. The multilayer film 1 is, for example, an electrochromic multilayer film which can be switched from a transparent, uncolored state into a colored state with reduced light transmission.

The laminated pane has, for example, four independent switching regions S1, S2, S3, S4 in which the switching state of the multilayer film 1 can be set independently of one another. The switching regions S1, S2, S3, S4 are arranged one behind the other in the direction from the front edge to the rear edge of the roof panel, wherein the terms "front edge" and "rear edge" relate to the direction of travel of the vehicle. With the switching regions S1, S2, S3, S4, the driver of the vehicle can choose (for example as a function of the position of the sun) to darken only one region of the laminated pane instead of the entire laminated pane, while the other regions remain transparent.

The laminated pane has a circumferential edge region which is provided with an opaque cover printing 15. The said cover printing 15 is typically formed from a black enamel. It is imprinted as printing ink with a black pigment and glass frits in a screen-printing method and is burned into the pane surface. The cover printing 15 is applied, for example, on the interior-side surface of the first pane 12 and also on the interior-side surface of the second pane 13. The side edges of the multilayer film 1 are covered by this cover printing 15.

Figure 3:
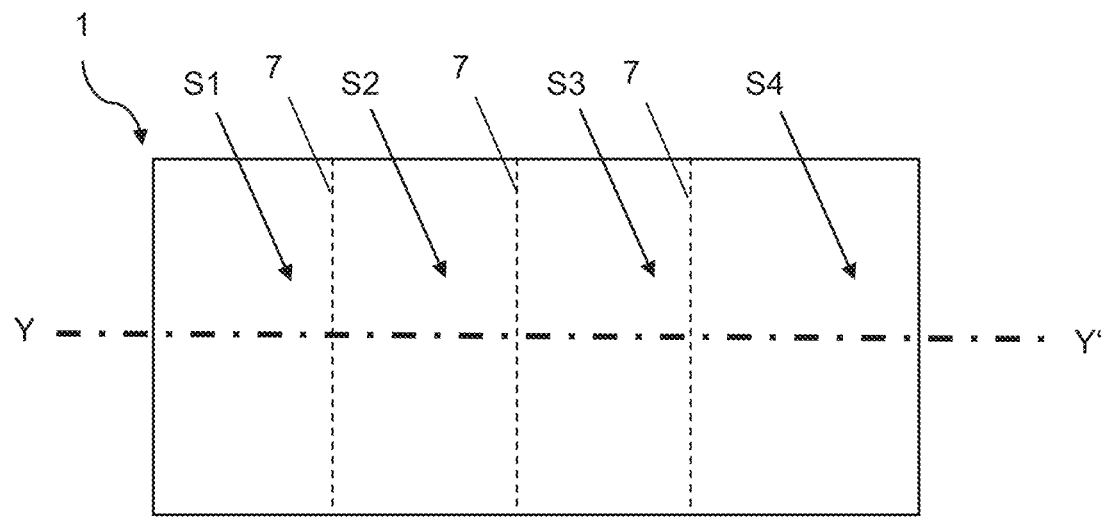
FIG. 3 shows a plan view of the multilayer film before the production of the laminated pane according to FIG. 1.
Figure 4:
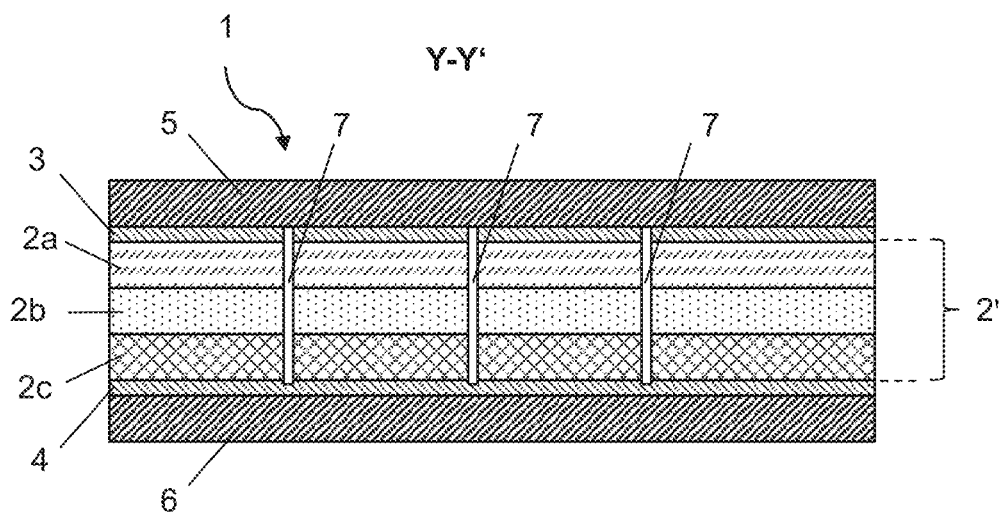
FIG. 4 shows a cross-section along Y-Y' through the multilayer film of FIG. 3.

FIGS. 3 and 4 each show a detail of the multilayer film 1 before it has been laminated into the laminated pane according to FIG. 1. The multilayer film 1 is delimited by a first carrier film 5 and a second carrier film 6. The carrier films 5, 6 are made of PET and have a thickness of, for example, 0.125 mm. The carrier films 5, 6 are provided with a coating made of ITO with a thickness of about 100 nm and form a first planar electrode 3 and a second planar electrode 4. An active layer sequence 2' is arranged between the planar electrodes 3, 4. The layer sequence 2' is an electrochromic layer sequence and consists of an ion storage layer 2*a*, an electrolyte layer 2*b* and an electrochromic layer 2*c*. By means of a DC voltage applied to the planar electrodes 3, 4, ions can be excited to migrate from the ion storage layer 2*a* through the electrolyte layer 2*b* and into the electrochromic layer 2*c*, and vice versa. The amount of ions in the electrochromic layer 2*c* determines its optical properties, in particular the degree of light transmission and the color.

The multilayer film 1 has three insulation lines 7 which extend parallel to one another from one side edge to the opposite side edge. The insulation lines 7 separate the first planar electrodes 3 and the active layer sequence 2' into segments electrically insulated from one another. These segments form the four independent switching regions S1, S2, S3, S4 of the multilayer film 1 or later of the laminated pane. The second planar electrode 4 is not completely separated into segments by the insulation lines 7—the insulation lines 7 extend only over a part of the layer thickness of the second planar electrode 4, for example approximately 10%. The segments of the first planar electrode 3 are electrically contacted independently of one another and connected to a voltage source, so that the optical properties of the switching regions S1, S2, S3, S4 can be controlled independently of one another. The non-segmented second planar electrode 4 provides a reference potential for all segments of the first planar electrode 3.

Figure 5:
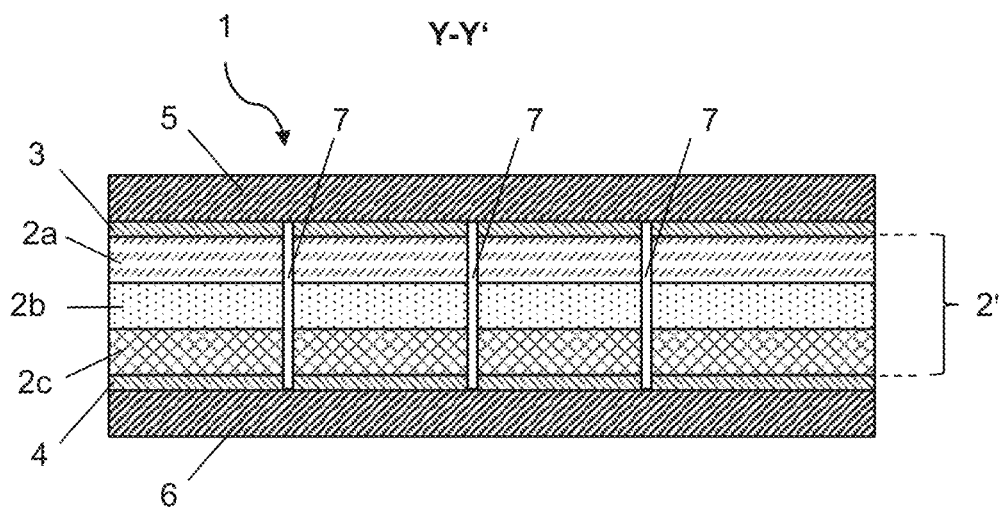
FIG. 5 shows a cross-section along Y-Y' of a further embodiment of the multilayer film according to the invention.

FIG. 5 shows a cross-section through a further embodiment of the multilayer film 1 according to the invention. The multilayer film 1 is an electrochromic multilayer film which is basically designed as in FIG. 4. In contrast, the insulation lines 7 extend not only through the first planar electrode 3 and the active layer sequence 2', but also through the second planar electrode 4. The second planar electrode 4 is thus also divided by the insulation lines 7 into segments electrically insulated from one another, which are electrically contacted independently of one another.

Figure 6:
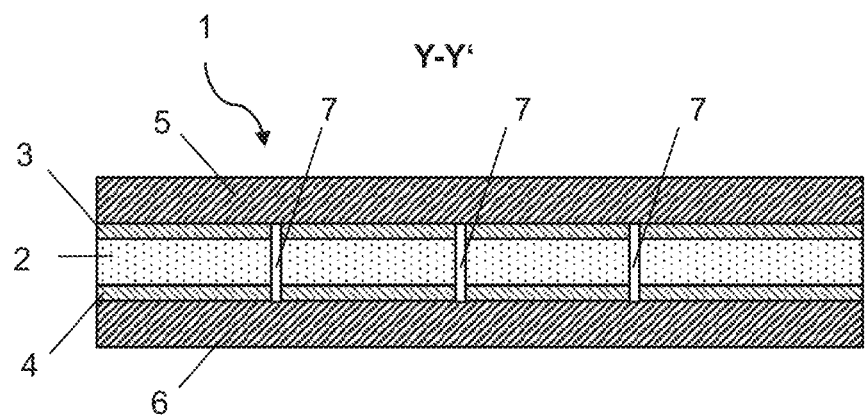
FIG. 6 shows a cross-section along Y-Y' of a further embodiment of the multilayer film according to the invention.

FIG. 6 shows a cross-section through a further embodiment of the multilayer film 1 according to the invention. It is a PDLC multilayer film. It also comprises two carrier layers 5, 6 and two planar electrodes 3, 4, which are designed in the same way as in the case of the electrochromic multilayer film of FIG. 4. An active layer 2 is arranged between the planar electrodes 3, 4. The active layer 2 is a PDLC layer and contains liquid crystals in a polymer matrix which can be aligned by an alternating voltage applied to the planar electrodes 3, 4. The active layer 2 is then transparent. Without voltage, the liquid crystals are present in an unaligned manner, leading to a state of strong light scattering. Both planar electrodes 3, 4 and the active layer 2 are divided into four segments by three insulation lines 7, which segments form independent switching regions S1, S2, S3, S4.

Figure 7:
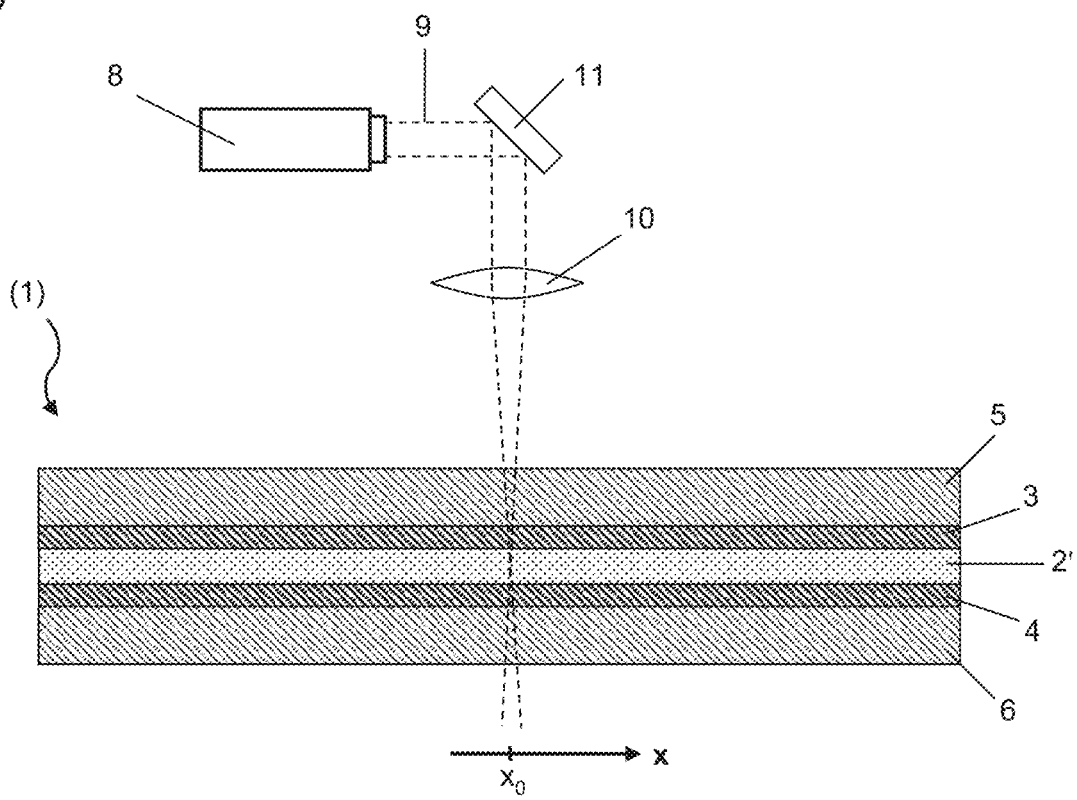
FIG. 7 shows a cross-section through the multilayer film according to FIG. 3 during the method according to the invention.
Figure 7:
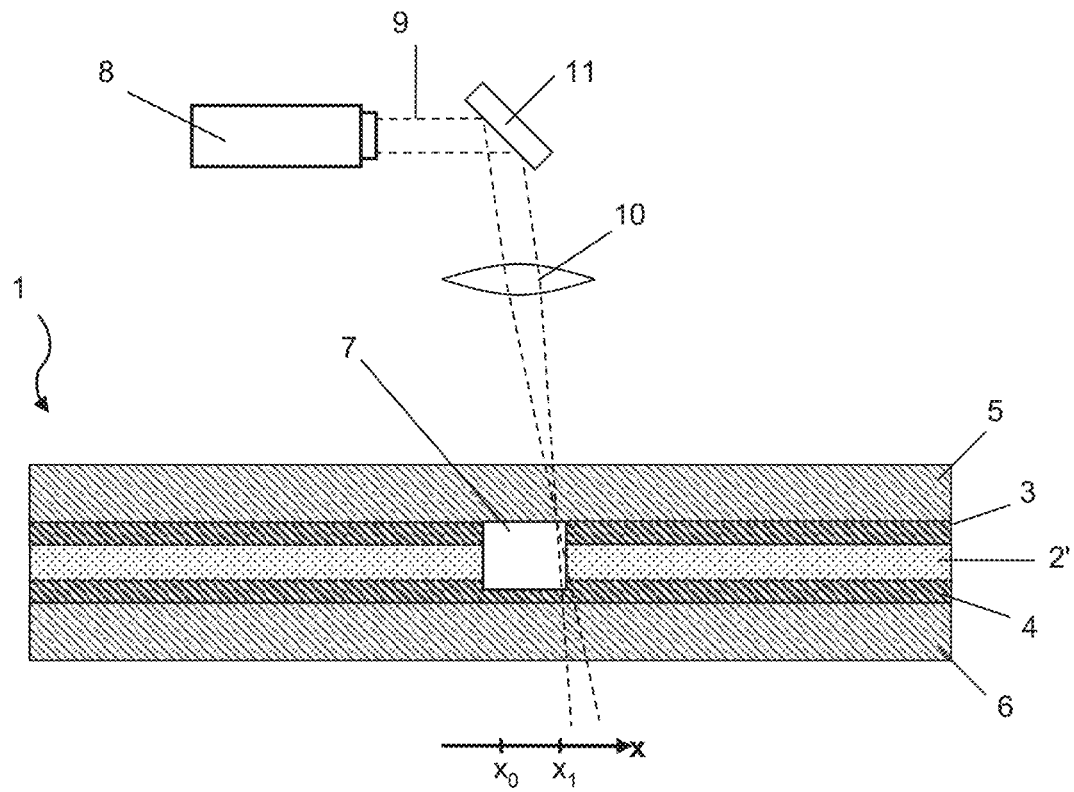

FIG. 7 shows a cross-section through the electrochromic multilayer film 1 of FIG. 3 during the method according to the invention. For the sake of simplicity, the electrochromic layer sequence 2' is shown as a single layer. The multilayer film 1 is cut, for example, from a purchased film. By means of a f-theta lens as focusing element 10, the radiation 9 of a laser 8 is directed through the first carrier film 5 at position $x_0$ and to the planar electrodes 3, 4 and the layer sequence 2' located in between, for example focused on the first planar electrode 3 (FIG. 7a). The radiation 9 can be moved along direction x over the multilayer film 1 by means of a movable mirror 11. The movement of the radiation 9 leads to a laser-induced degeneration of the first planar electrode 3 and all layers 2a, 2b, 2c of the layer sequence 2'. At a later point in time (FIG. 7b), the radiation 9 has been moved from position $x_0$ to position $x_1$, resulting in an insulation line 7 within the first planar electrode 3 and all layers 2a, 2b, 2c of the layer sequence 2' between positions $x_0$ and $x_1$. The insulation line 7 is an electrically non-conductive linear region which extends over the entire thickness of the first planar electrode 3 and the electrochromic layer sequence 2' and the course of which depends on movement direction x. The second planar electrode 4 is only slightly influenced, in particular not completely severed, by the laser. The carrier film 5 is not damaged when the insulation line 7 is introduced.

The figure is to be understood merely as an example to illustrate the principle according to the invention. In order to produce the insulation lines 7 according to FIG. 3, it is expedient to move the radiation 9 from one side edge of the multilayer film 1 (position $x_0$) to the opposite side edge (position $x_1$).

Proper process control makes it possible also to cut through the second planar electrode 4 in addition to the first planar electrode 3 and the active layer sequence 2'. This can be achieved by suitably adapting the parameters of the laser radiation and/or by repeatedly moving over the line to be cut.

FIG. 8 shows a further embodiment of the multilayer film 1 according to the invention, again, by way of example, an electrochromic multilayer film. The insulation line 7 describes a closed shape which for the sake of simplicity is shown as a square. The planar electrodes 3, 4 and the active layer sequence 2' are severed by the insulation line 7, whereby the enclosed region is electrically insulated from the surrounding region. The surrounding region is provided as a switching region S1 the optical properties of which can be electrically controlled. In principle, the enclosed region can also be provided as a switching region, which, however, would require electrical contacting in the viewing area of the laminated pane into which the multilayer film 1 is to be laminated. This is disadvantageous because it is visually noticeable. The embodiment is therefore particularly suitable for electrically insulating the enclosed region and thereby exempting it from the control of the optical properties. The enclosed region therefore retains its optical properties, irrespective of the switching state of the surrounding region. The insulation line 7 can, for example, have the shape of a symbol or company logo, which is thus made visible in an aesthetically appealing manner.

FIG. 9 shows a further embodiment of the multilayer film 1 according to the invention, again, by way of example, an electrochromic multilayer film. The two ends of the insulation line 7 are arranged on a side edge of the multilayer film 1, with a relatively small distance from one another. The insulation line 7 thus runs from the side edge toward the center of the multilayer film 1, where it describes a geometric figure and runs back to the same side edge. The two partial regions, which are insulated from one another, of the planar electrodes 3, 4 and the active layer sequence 2' can be designed as independent switching regions S1, S2. The switching region S2 enclosed by the insulation line 7 also extends to the side edge of the multilayer film 1, where it can be electrically contacted in a visually inconspicuous manner. The said geometric figure can be, for example, a symbol with which information is displayed to the user when the switching states of the switching regions S1, S2 are different.

EXAMPLES

Electrochromic multilayer films 1 as provided in FIG. 4 were provided. With the method according to the invention, insulation lines 7 were introduced into the first planar electrode 3 and the active layer sequence 2' to produce a plurality of independent switching regions. The multilayer films 1 were then assessed by visual inspection. In addition, the switching behavior was assessed, in particular in terms of whether switching states of switching regions cause an undesired change in the optical properties in adjacent, actually voltage-free switching regions (leakage).

The tests were carried out with laser radiation of various wavelengths and various pulse lengths. A Yb:YAG laser operated in pulsed mode was used in each case as laser 8, which was operated with its fundamental radiation (1064 nm), frequency-doubled (515 nm, second harmonic) and frequency-tripled (343 nm; third harmonic).

The laser radiation 9 was focused onto the multilayer film 1 by means of a f-theta lens having a focal length of 250 mm and moved over it. The output power of the laser radiation 9 was 10 W in each case, the movement speed was 1 m/s.

The observations at different wavelengths and pulse lengths are summarized in Table 1, wherein:
[1] means optimal result:
Segments are electrically insulated (no leakage), no burns or blistering in the multilayer film 1
[2] means less good result:
Segments are electrically insulated (no leakage), no burns, but blistering in the multilayer film 1
[3] means unacceptable result:
segments are not electrically insulated (leakage) and/or burns and blistering in the multilayer film 1

TABLE 1

| | | Wavelength | | |
| --- | --- | --- | --- | --- |
| | | 343 nm | 515 nm | 1030 nm |
| Pulse length | 200 fs | [3] | [2] | [3] |
| | 800 fs | [3] | [2] | [2] |
| | 10 ps | [3] | [2] | [3] |
| | 1.5 ns | [1] | | |
| | 20 ns | [1] | [3] | [3] |

The best results were achieved with UV radiation (343 nm) and pulse lengths in the nanosecond range. Acceptable results with pulse lengths in the femtosecond and picosecond range were achieved with green laser radiation (515 nm). It can be assumed that the slight impairments of the multilayer film 1 (blistering) can be avoided by optimizing the laser parameters. With IR radiation (1030 nm), acceptable results were achieved only in a single example (pulse length 800 fs).

The results suggest that when using UV radiation (for example 200 nm to 400 nm), pulse lengths in the nanosecond range are preferred (for example 1 ns to 25 ns), while when using radiation in the visible and IR range (for example 500 nm to 600 nm and 950 nm to 1050 nm), pulse lengths in the femtosecond and picosecond range are preferred (for example 100 fs to 50 ps).

LIST OF REFERENCE SIGNS (1) Multilayer film having electrically controllable optical properties (2) Active layer of the multilayer film 1
(2') Active layer sequence of the multilayer film 1
(2a) Ion storage layer of an electrochromic layer sequence 2'
(2b) Electrolyte layer of an electrochromic layer sequence 2'
(2c) Electrochromic layer of an electrochromic layer sequence 2'
(3) First planar electrode of the multilayer film 1
(4) Second planar electrode of the multilayer film 1
(5) First carrier film of the multilayer film 1
(6) Second carrier film of the multilayer film 1
(7) Insulation line
(8) Laser
(9) Radiation of the laser 8
(10) Focusing element
(11) Tiltable mirror
(12) First pane
(13) Second pane
(14a) First thermoplastic bonding film
(14b) Second thermoplastic bonding film
(14c) Third thermoplastic bonding film
(15) Cover printing
(V) Laminated pane
(S1, S2, S3, S4) Independent switching regions of the multilayer film 1 or laminated pane V
x Direction of movement of the radiation 9
$x_0$, $x_1$ Positions of the radiation 9 during the method according to the invention
X-X' Cutting line
Y-Y' Cutting line

The invention claimed is:

1. A multilayer film having electrically controllable optical properties, comprising in the order specified and arranged one above the other in a planar manner:
   a) a first carrier film,
   b) a first planar electrode,
   c) an active layer comprising one or more layers in sequence, the active layer having electrically controllable optical properties,
   d) a second planar electrode,
   e) a second carrier film, and
   f) at least one insulation line laser machined through one of the first carrier film or second carrier film and into the first planar electrode and the active layer,
   wherein the at least one insulation line extends through the first planar electrode and the first active layer without extending into the first carrier film and the second carrier film, the at least one insulation line dividing the first planar electrode and the active layer into at least two segments that are electrically insulated from one another.

2. The multilayer film according to claim 1,
   wherein the multilayer film is an electrochromic multilayer film having electrochromic active layers,
   the electrochromic active layers comprising in the order specified and arranged one above the other in a planar manner:
   c1) an ion storage layer,
   c2) an electrolyte layer, and
   c3) an electrochromic layer.

3. The multilayer film according to claim 1,
   wherein the multilayer film is a polymer-dispersed liquid crystal multilayer film,
   wherein the active layer is a polymer-dispersed liquid crystal layer that contains liquid crystals embedded in a polymer matrix, and
   wherein the second planar electrode is divided by the at least one insulation line into at least two segments that are electrically insulated from one another.

4. The multilayer film according to claim 1,
   wherein the at least one insulation line extends through the first planar electrode and the active layer,
   wherein material of the first planar electrode is completely removed or chemically modified in a first region of the at least one insulation line such that a resulting at least two first planar electrode segments are electrically insulated from one another, and
   wherein material of the active layer is completely removed or chemically modified in a second region of the at least one insulation line such that a resulting at least two active layer segments are electrically insulated from one another.

5. The multilayer film according to claim 1, wherein a line width of the at least one insulation line is less than or equal to 500 μm.

6. The multilayer film according to claim 5, wherein the line width of the at least one insulation line is between 10 μm and 150 μm.

7. The multilayer film according to claim 6, wherein the line width of the at least one insulation line is between 20 μm and 100 μm.

8. The multilayer film according to claim 1, wherein the first carrier film and the second carrier film comprise polyethylene terephthalate and have a thickness of 0.1 mm to 0.5 mm.

9. The multilayer film according to claim 1, wherein the first planar electrode and the second planar electrode comprise silver or indium tin oxide and have a thickness of 20 nm to 1 μm.

10. A laminated pane comprising a first pane, a second pane, and a multilayer film according to claim 1, wherein the multilayer film is arranged between the first pane and the second pane and is connected to the first pane via a first thermoplastic bonding film and the second pane via a second thermoplastic bonding film.

11. The laminated pane according to claim 10, wherein the first pane and the second pane are glass panes.

12. A method for fabricating a multilayer film having electrically switchable optical properties, the method comprising:
   (A) providing a multilayer film having electrically controllable optical properties, the multilayer film comprising in the order specified and arranged one above the other in a planar manner:
      a) a first carrier film,
      b) a first planar electrode,
      c) an active layer comprising one or more layers in sequence, the active layer having electrically controllable optical properties,
      d) a second planar electrode,
      e) a second carrier film, and
      f) at least one insulation line laser machined through one of the first carrier film or second carrier film and into the first planar electrode and the active layer,
   (B) directing laser radiation through the first carrier film or second carrier film to the first planar electrode, the active layer and the second planar electrode, and
   (C) moving the laser radiation along at least one line to introduce the at least one insulation line into the first planar electrode and the active layer without the at least one insulation line extending into the first carrier film and the second carrier film, such that the first planar electrode is divided into at least two first planar electrode segments that are electrically insulated from one another and the active layer is divided into at least two active layer segments that are electrically insulated from one another.

13. The method according to claim 12, wherein the laser radiation is moved exactly once along the at least one line, and wherein a first insulation line is simultaneously introduced into the first planar electrode and the active layer.

14. The method according to claim 13, wherein the first insulation line is further simultaneously introduced at least partially into the second planar electrode.

15. The method according to claim 12, wherein a wavelength of the laser radiation is from 200 nm to 1200 nm.

16. The method according to claim 15, wherein the wavelength of the radiation is from 300 nm to 400 nm.

17. The method according to claim 12, wherein the laser is operated in pulsed mode.

18. The method according to claim 17, wherein a pulse length is less than or equal to 50 ns.

19. A structure comprising the multilayer film according to claim 1, the structure being selected from the group consisting of: i) a glazing, ii) a laminated pane, iii) an access or a window region in a building, and iv) a rear pane, side pane, or roof panel on a train, ship, aircraft or motor vehicle.

20. The multilayer film according to claim 1,
   wherein the at least one insulation line further extends in a controllable manner at least partially into the second planar electrode.

* * * * *